United States Patent [19]
Chao et al.

[11] Patent Number: 5,952,417
[45] Date of Patent: Sep. 14, 1999

[54] COMPOSITION AND METHOD FOR IMPROVED HEAT PERFORMANCE IN A POLYPHENYLENE ETHER CONTAINING SUBSTRATE

[75] Inventors: Herbert Shin-I Chao, Schenectady; Geoffrey Henry Riding, Castleton; Carol Lynn Fasoldt, Averill Park, all of N.Y.

[73] Assignee: General Electric Co., Schenectady, N.Y.

[21] Appl. No.: 08/768,350

[22] Filed: Dec. 17, 1996

[51] Int. Cl.⁶ .............................. C08K 3/20; C08K 3/22; C08F 283/08; B05D 3/10
[52] U.S. Cl. .................... 524/451; 524/425; 524/449; 524/413; 524/440; 524/445; 525/68; 525/390; 525/391; 525/395; 525/396; 525/397; 525/905; 427/307
[58] Field of Search ...................... 524/451, 425, 524/449, 413, 440, 445; 525/68, 390, 391, 395, 396, 397, 905; 427/307

[56] References Cited

U.S. PATENT DOCUMENTS

| | | | |
|---|---|---|---|
| 4,172,929 | 10/1979 | Cooper et al. | 521/139 |
| 4,590,239 | 5/1986 | Sugio et al. | 525/92 |
| 4,900,786 | 2/1990 | Abolins et al. | 525/68 |
| 5,019,616 | 5/1991 | Avakian et al. | 524/451 |
| 5,112,681 | 5/1992 | Myojo et al. | 428/335 |
| 5,413,817 | 5/1995 | Chao et al. | 427/306 |
| 5,773,536 | 6/1998 | Mizoguchi et al. | 521/63 |

FOREIGN PATENT DOCUMENTS

| | | |
|---|---|---|
| 0037124 | 3/1981 | European Pat. Off. . |
| 0054845 | 12/1981 | European Pat. Off. . |

OTHER PUBLICATIONS

Japanese Patent Abstract, Publication No. 02255860, Oct. 16, 1990 "Polyphenylene Ether Resin Composition", by Fujii Susumu.
European Search Report.

*Primary Examiner*—James J. Seidleck
*Assistant Examiner*—Olga Asinovsky
*Attorney, Agent, or Firm*—Noreen C. Johnson; Douglas E. Stoner

[57] ABSTRACT

The invention provides a composition for a platable resinous substrate having enhanced heat performance comprising: a thermoplastic mixture of at least one polyphenylene ether and at least one poly(alkenylaromatic) compound, at least one rubber compound, and at least one inorganic filler material.

17 Claims, No Drawings

COMPOSITION AND METHOD FOR IMPROVED HEAT PERFORMANCE IN A POLYPHENYLENE ETHER CONTAINING SUBSTRATE

FIELD OF THE INVENTION

The present invention relates to polyphenylene ether resin compositions having improved heat distortion temperature properties. More particularly, the invention relates to substrate compositions containing polyphenylene ether resins and inorganic fillers. It also relates to a method for promoting the adhesion of metal coatings to the surfaces of said substrate compositions that have improved heat distortion properties. The invention is further related to resinous articles containing inorganic fillers that are subsequently metallized with metallic coatings.

BACKGROUND OF THE INVENTION

Metallized plastics have become of interest in recent years as a replacement for metal in such articles as automobiles, enclosures for electrical appliances, microwave ovens, business machines and the like. When fabricated of plastics alone, such articles are inadequate to shield internal parts from external radiation sources. Also, plastic articles often need a metallized exterior coating for an aesthetic appearance. The metal coatings are provided on the surface of the plastic substrate typically by electroless or electrolytic deposition.

A plastic product sold commercially by General Electric Company under the tradename NORYL® is often used in applications requiring a metal coating on the exterior surface. Noryl products are commercially available mainly as mixtures of polyphenylene ether (PPE) with poly(alkenylaromatic compounds), also sometimes referred to as polystyrene (PS).

One of the most serious problems which arise in the metallization of plastics is the lack of adhesion of the metal layer to the plastic substrate. One principal method for improving adhesion of metal layers to the substrate surfaces of polyphenylene ether and polystyrene mixtures involves surface treatment with chromic acid to provide crevices in the substrate surface for the subsequent metal coating to adhere to.

In order to produce crevices on a substrate surface, such as Noryl, which in turn promotes adhesion when metal is later deposited, the surface of the Noryl has to be created such that the etching solution, (i.e., chromic acid), can selectively etch a particular component in the substrate composition. Presently, a plating grade of Noryl PN235 employs a large quantity of rubber in the blend, so that the etching solution can attack the rubber preferentially. However, high rubber content in the Noryl PN235 composition, also causes the heat distortion temperature (HDT) of the substrate to decrease. In exterior applications, such as automotive wheel covers, enhanced heat performance is required. Thus, to maintain the heat distortion temperature or enhance the heat performance, there is a need for an improved platable Noryl composition having high heat properties and good adhesion with metallic coatings. Such compositions and method are provided by the present invention.

SUMMARY OF THE INVENTION

Accordingly, the invention provides a composition for a platable resinous substrate having enhanced heat performance comprising: a thermoplastic mixture of at least one polyphenylene ether and at least one poly(alkenylaromatic compound), at least one rubber compound, and at least one inorganic filler material. The inventive composition may also contain conventional additives, such as mold release compounds, stabilizers, antioxidants, impact modifiers, and flame retardant additives. In the inventive composition, the polyphenylene ether is present in an amount of at least 50 parts by weight in proportion to the poly(alkenylaromatic compound), where the total parts by weight of the polyphenylene ether-poly(alkenylaromatic compound) is 100 parts.

In another aspect of the invention, a method is provided for a process to improve the heat performance of a platable resinous substrate, said method comprising the steps of:

blending a mixture of at least one polyphenylene ether and at least one poly(alkenylaromatic) compound, where the polyphenylene ether is present in a proportion of at least 50 parts by weight of the total parts by weight of the polyphenylene ether-poly(alkenylaromatic) compound mixture of 100 parts;

adding an inorganic filler to said polyphenylene ether-poly(alkenylaromatic) compound mixture in an amount that produces sufficient crevices for adhesion of a metallic coating to the resinous substrate when said substrate is treated with an etching solution; and forming the resinous substrate with the polyphenylene ether-poly(alkenylaromatic) compound mixture containing the inorganic filler.

Still another aspect of the invention is an improved metallic plated thermoplastic article, which comprises: a substrate molded from a thermoplastic consisting essentially of a mixture of 50 to 80 weight percent of polyphenylene ether resin and 20 to 50 weight percent of a poly(alkenylaromatic) compound, and a sufficient amount of an inorganic filler to provide crevices in a substrate surface when etched; and at least one metal coating adhered directly to the substrate surface.

It is a principal object of this invention to provide a plastic composition that is capable of being molded into a substrate that is platable. It is a further object of the invention to have a thermoplastic substrate having high impact strength, high flexural strength, and enhanced heat performance.

DESCRIPTION OF THE INVENTION

The plastic compositions and resinous substrates, herein also referred to as thermoplastic substrates, of the present invention comprise blends of polyphenylene ethers and poly(alkenylaromatic) compounds with inorganic fillers, such as but not limited to, clay, calcium carbonate, talc, mica, silica, titanium oxide, and mixtures thereof. It has been found that to improve the heat distortion temperature and the platability of the thermoplastic substrate, blending inorganic fillers of fine particle size into the polyphenylene ethers-poly(alkenylaromatic) compounds composition enhances the adhesion of subsequent metal coatings and the heat performance of the underlying thermoplastic substrate. It has been found that the chromic acid etchant solution tends to etch the interface between the inorganic filler particle and the polyphenylene ether-polystyrene (alkenylaromatic) continuous phase. The filler particle then either falls out or is consumed by the etching media leaving a thermoplastic substrate surface with desirable crevices and pits, that enhance the adhesion of subsequent metallic coatings.

The polyphenylene ethers are known polymers comprising a plurality of structural units of the formula

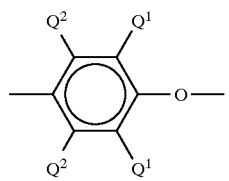

wherein in each of said units independently, each $Q^1$ is independently halogen, primary or secondary lower alkyl (i.e., alkyl containing up to seven carbon atoms), phenyl, haloalkyl, aminoalkyl, hydrocarbonoxy, or halohydrocarbonoxy wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{(1-4)}$-alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with for example, 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals, undergo reaction in known manner with the hydroxy groups of two polyphenylene ether chains to produce a higher molecular weight polymer, provided a substantial proportion of free OH groups remains.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as copper, manganese, or cobalt compound, usually in combination with various other materials.

Particularly useful polyphenylene ethers for many purposes are those with which comprise molecules having at least one aminoalkyl-containing end group. The amino-alkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybipheyl end groups, typically obtained from reaction mixtures in which a by-product diphenoquinone is present, especially in a copper-halide secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The poly(alkenylaromatic) compounds employed in the mixtures of polyphenylene ether and poly(alkenylaromatic compounds) include homopolymers and copolymers of such compounds as styrene, α-methylstyrene, 4-methylstyrene and dibromostyrene. Styrene is generally preferred. Particularly preferred are conventional rubber-modified polystyrenes, sometimes designated "high impact polystyrene" or "HIPS".

It is known that polyphenylene ethers and poly (alkenylaromatic) compounds are miscible in all proportions. While polyphenylene ether and poly(alkenylaromatic) compound blends containing any proportion of the two resins may be employed in the invention, it is preferred that the polyphenylene ether be present in amounts of at least about 10% by weight and most preferably at least about 30% by weight, based on the two polymers.

The polyphenylene ether and poly(alkenylaromatic) compound mixture also contains a rubber additive. The following types of rubber-like polymers may be added into the polyphenylene ether resin and poly(alkenylaromatic compound) of the resin composite; natural rubber, butadiene polymer, butadiene-styrene copolymer and its hydrated species (random copolymer, block copolymer, graft copolymer, etc.), isoprene polymer, chlorobutadiene polymer, butadiene-acrylonitrile copolymer, isobutylene polymer, isobutylene-butadiene copolymer, isobutylene-isoprene copolymer, acrylate polymer, ethylenepropylene copolymer, ethylene-propylene-diene copolymer, styrene-type polymers, such as the simple copolymers of styrene and its derivatives, as well as styrene-type polymers blended or modified by material and synthetic elastomer substances, such as polybutadiene, polyisoprene, butyl rubber, EPDM, ethylene-propylene copolymer, natural rubber, epichlorohydrin, styrene-containing copolymers, styrene-maleic anhydride copolymer, etc. Styrene-type polymers including homopolystyrene and rubber-reinforced polystyrene are preferred rubber additives for this invention. A commercial example of such a compound would be Stereon 840A from Firestone. The rubber compound is generally added in about 5 to 15 parts by weight of the substrate composition.

Other additives that may be contained in the substrate composition are mold releases such as polyethylene and stabilizers such as tridecylphosphite (TDP). The mold release is present in about 0.5 to 5 parts by weight, the preferred amount is about 1 part by weight. The stabilizer is present in about 0.1 to 1.5 parts by weight, with the preferred being about 0.5 parts by weight.

The inorganic fillers, such as calcium carbonate, clay, mica, talc, silicone, and mixtures thereof, are present in the substrate composition in the range of about 2–30 parts by weight. The preferred ranges are about 10–20 parts by weight.

The following Table I shows some compositions of the present invention. A control composition without an inorganic filler is also shown for comparison as Sample 1.

TABLE I

| Sample | 1 (Control) | 2 | 3 | 4 | 5 | 6 |
|---|---|---|---|---|---|---|
| PPE (0.46 I. V.)$_1$ | 25 | 45 | 45 | 45 | 45 | 45 |
| HIPS$_2$ (GEH) | 65 | 45 | 45 | 45 | 45 | 45 |

TABLE I-continued

| Sample | 1 (Control) | 2 | 3 | 4 | 5 | 6 |
|---|---|---|---|---|---|---|
| Stereon 840A$_3$ | 10 | 10 | 10 | 10 | 10 | 10 |
| PE$_4$ | 1 | 1 | 1 | 1 | 1 | 1 |
| TDP$_5$ | 0.5 | 0.5 | 0.5 | 0.5 | 0.5 | 0.5 |
| Omya (CaCO$_3$ UF)$_6$ | | 10 | 20 | | | |
| Clay (HG90)$_7$ | | | | 10 | 20 | 20 |
| Silicone (Viscasil)$_8$ | | | | | | 2 |

$_1$PPE (0.46 Intrinsic Viscosity)
$_2$HIPS - High Impact Polystyrene
$_3$Stereon 840A - impact modifier
$_4$PE - Polyethylene mold release
$_5$TDP - tridecylphosphite
$_6$Omya(CaCO$_3$ UF) - Inorganic Filler
$_7$Clay (HG 90) - Inorganic Filler
$_8$Silicone (Viscasil) - Inorganic Filler It can be seen from the compositions of the samples in Table I that by increasing the polyphenylene ether and reducing the poly(alkenylaromatic compound) from that of the control composition in Sample 1 that the heat distortion temperature of the substrate should increase due to the lower rubber content.

When the surface is prepared for metal deposition, generally chromic acid is used as an etchant to roughen the Noryl surface with crevices and pits. By increasing the polyphenylene ether and decreasing the rubber content without an inorganic filler present, the chromic acid does not differentiate and select the rubber additive to etch. As a result, a smoother substrate surface is obtained that is not conducive for adhesion of subsequent metal coatings. However, while maintaining a higher polyphenylene ether content in the composition, the addition of the inorganic filler provides an interface between the inorganic filler particle and the polyphenylene ether-rubber continuous phase for the chromic acid etchant to attack. The filler particle either is removed or consumed by the etching media leaving a rough substrate surface with pits and crevices for subsequent metal adhesion.

The resinous substrates made from the compositions of this invention are advantageous for electroless metal deposition. After the surface is prepared with an etchant, such as chromic acid, conventional methods for electroless deposition involving art-recognized commercially available reagents may be used. Methods of this type generally begin with a pretreatment to aid in the absorption of the electroless deposition catalyst, typically with a reagent such as Shipley Cleaner-Condition 1175A which is an alkaline solution containing organic compounds. Another product which may be used after the chromic acid etch is Shipley Circuposit™ MLB 216 to remove the chromate residue from the substrate surface. This may be followed by surface activation employing, for example, Shipley Cataprep™ 404 containing sodium bisulfate and various surfactants; and then by treatment with an acidic palladium-containing solution as a catalyst, illustrated by Shipley Cataposit™ 44 which comprises tin and palladium compounds, the palladium being the principal catalytic species.

After a water rinse, the resinous substrate may be immersed in a solution of Shipley Cuposit™ Accelerator 19, a fluoboric acid-containing formulation used to remove tin, or an equivalent thereof. The substrate may then be further rinsed with water and treated with one or more electroless plating solutions.

Electroless plating baths are well known in the art and are generally described, for example in Kirk-Othmer, Encyclopedia of Chemical Technology, 3rd Edition, Vol. 8, the contents of which are incorporated herein by reference. The selection of a particular electroless plating bath or process is not critical to the invention. The contents of the bath and the plating parameters such as temperature, pH and immersion time will of course depend on the metal to be deposited. Suitable plating baths include Shipley Cuposit™ 250 and 251 and Enthone Enplate™ NI-426. The former two are electroless copper solutions and later an electroless nickel solution.

Following metallization by electroless deposition, the metal layer may be heat treated at a temperature in the range of about 50°–80° C., preferably about 70°–80° C. for a period of time sufficient to stabilize adhesion of the electroless metal to the resin surface. Said time period is at least 10 minutes and typically from 30 minutes to about 2 hours.

At least one further metal coating, preferably of copper, may be deposited on the substrate after the initial electroless metal deposition. Deposition of said further coating may be by conventional methods including electroless and electrolytic deposition, the details of which are likewise known to those skilled in the art. Following deposition of further metal coatings, it is strongly preferred to further heat-treat the metal surface at a similar temperature, in this instance for a period of from about 30 minutes to about 5 hours.

Metallized articles comprising resinous substrates of the inventive compositions defined hereinabove are another aspect of the invention. They have substantially improved adhesion of the metal to the resin surface and improved heat performance in comparison with untreated substrates. The adhesion is measured by a "peel strength" method. In this method, strips of tape, 3.2 mm wide are used to mask portions of the metallized surface after deposition of electrolytic copper and the exposed copper is etched away with concentrated nitric acid. The substrate is rinsed thoroughly in water, after which the force required to remove one or more of the remaining copper strips by peeling it away at 90° is measured (IPC method 2.4.8).

The invention is illustrated by the following examples. All percentages are by weight.

EXAMPLE 1

Test strips were prepared from the polyphenylene ether-poly(alkenylaromatic compound) blend comprising 35% by weight of polyphenyl ether and 45% by weight of the poly(alkenylaromatic compound) as shown in Table I Samples 2–6. Ten parts by weight of Stereon 840A were used and 1 part by weight of polyethylene as a mold release was added with 0.5 part by weight TDP, also shown in Table I, Samples 2–6. Two samples 2 and 3) had calcium carbonate added in two different amounts: Sample 2 had 10 parts by weight, and Sample 3 had 20 parts by weight. Clay was also used as inorganic filler in Samples 4–6 and in an amount of 10 parts by weight in Sample 4 and 20 parts by weight in Samples 5 and 6. Silicone was added to Sample 6 in 2 parts by weight.

The test strips were immersed in Micro™ (2.0 v/v %) at 50° C. for 5 minutes to remove grease and possible contaminants on the surface. The strips were then rinsed with water for 2 minutes after microcleaning. The strips were then treated by the chromic acid etchant solution. The test strips of the inventive composition were treated to a chromic acid etch with the etching bath having sulfuric acid and chromium trioxide. The etching bath was prepared by adding the sulfuric acid (160 ml) to distilled water (740 ml). To the resulting solution, chromium trioxide (450 grams) was slowly added to make a liter of chromic acid etching solution. The test strips were dipped in the etching bath at 70° C. for about 15 minutes.

After the 15 minutes in the chromic acid etchant, the test strips were rinsed with water for about 2 minutes and placed in a Shipley Circuposit™ MLB 216 bath for 5 minutes at 50° C. to remove the chromate residue. The strips were then rinsed with aerated water for about 2 minutes and then coated electrolessly with copper by the following scheme of operation:

Water rinse—2 minutes;
Shipley Cleaner Conditioner 1175A—5 minutes, 2.5% by volume, 75° C.;
Water rinse—2 minutes;
Shipley Cataprep 404—1 minute, 270 grams per liter;
Shipley Cataposit™ 44 (1.5% by volume), and Cataprep 404 at 270 grams per liter, 44° C.—3 minutes;
Water rinse—2 minutes;
Shipley Accelerator 19—3 minutes, 16% by volume;
Water rinse—2 minutes;
Shipley Cuposit™ 251 electroless copper—10 minutes, 48° C.;
Water rinse—2 minutes.

The electroless copper plated test strips were then electroplated with copper from an acid copper bath for 90 minutes at density of 32 milliamps per centimeter square. The resulting copper coatings were masked with strips of tape 3.2 millimeters wide and the exposed copper was etched with concentrated nitric acid. After thorough rinsing, the tape was removed the remaining copper strips were subjected to a 90° peel test (PC method 2.4.8). The samples were then heated at 80° C. for about 2 to 4 hours to obtain a final peel strength. The results are given in Table II for Samples 1 through 6 having the compositions shown in Table I.

TABLE II

| Sample | Initial Peel Strength g/mm | Final Peel Strength g/mm |
|---|---|---|
| 1 | 48.40 | 150.38 |
| 2 | 15.54 | 110.55 |
| 3 | 65.37 | 113.95 |
| 4 | 9.64 | 109.84 |
| 5 | 33.93 | 104.48 |
| 6 | 17.32 | 108.77 |

The adhesion of copper to the Noryl formulations of this invention is comparable to that of the Noryl PN235 plating grade, judged by the final copper peel strength. When a high loading of the inorganic fillers, calcium carbonate or clay, is employed, the initial peel strength is in general better than the samples with the lower inorganic filler loading (Samples 2 and 4). The surface roughness of the Noryl substrate, which promotes mechanical interlocking with copper, is suspected to be more prevalent for those samples (3 and 5) of high inorganic filler loading.

EXAMPLE 2

Test substrates with identical formulations to those in Example 1 and as shown in Table I were plated with electroless copper. However, in the steps for plating electroless copper the adhesion promoter, 1175A, was eliminated and the catalyst concentration was reduced to one fourth of the original amount used in Example 1 (i.e. 0.375% by volume of Shipley Cataposit 44). After an electroless and electrolytic plating of copper, the test strips were again subjected to the 90° peel test. The test strips were then heat treated for about 2 to 4 hours at 80° C. and the peel test was repeated. The results are listed in Table III and the changes to do not appear to have any significant impact on the copper peel strength.

TABLE III

| Sample | Initial Peel Strength g/mm | Final Peel Strength g/mm |
|---|---|---|
| 1 | 89.12 | 120.73 |
| 2 | 84.84 | 129.13 |
| 3 | 107.52 | 141.45 |
| 4 | 56.08 | 110.55 |
| 5 | 68.76 | 130.91 |
| 6 | 64.48 | 109.48 |

What is claimed:

1. A composition for a platable resinous substrate having enhanced heat performance, comprising: a thermoplastic mixture of at least one polyphenylene ether and at least one poly(alkenylaromatic) compound, at least one inorganic filler material, and optionally at least one rubber compound, wherein the inorganic filler material is selected from the group consisting of clay, calcium carbonate, mica, talc, silica, titanium oxide, and mixtures thereof, and wherein the inorganic filler material is present in an amount of about 10–20 parts by weight, based on the total weight of a resin composition, said amount being sufficient to provide crevices and pits to a substrate molded from the composition, and wherein said crevices and pits provide adhesion to a metal coating on the substrate surface.

2. A composition according to claim 1 where the polyphenylene ether is present in an amount of at least about 50% by weight.

3. A composition according to claim 1 where the poly (alkenylaromatic compound) is polystyrene.

4. A composition according to claim 1 where the poly (alkenylaromatic compound) is present in an amount of about 50% by weight.

5. A composition according to claim 1 where the rubber compound is selected from the group consisting of polybutadiene copolymers, styrene-butadiene copolymers polystyrene ethylene butylene copolymers, and mixtures thereof.

6. A composition according to claim 1 where the rubber compound is present in an amount of about 10% by weight.

7. A composition according to claim 1, further comprising mold release compounds, flame retardant additives, antioxidants, stabilizers, and impact modifiers.

8. A composition according to claim 7 where said mold release compound is polyethylene.

9. A composition according to claim 7 where said flame retardant additive is selected from the group consisting of organo phosphates.

10. A method is provided for a process to improve the heat performance of a platable resinous substrate, said method comprising the steps of:

blending a mixture of at least one polyphenylene ether and at least one poly(alkenylaromatic) compound, where the polyphenylene ether is present in a proportion of at least 50 parts by weight of the total parts by weight of the polyphenylene ether-poly (alkenylaromatic compound) mixture of 100 parts;

adding an inorganic filler to said polyphenylene ether-poly (alkenylaromatic) compound mixture in an amount of about 10–20 parts by weight based on 100 parts by weight of the total amount of polyphenylene ether, poly(alkenylaromatic) compound and optionally a rubber compound, that produces sufficient crevices for adhesion of a metallic coating to the resinous substrate when said substrate is treated with an etching solution; and forming the resinous substrate with the polyphenylene ether poly(alkenylaromatic) compound mixture containing the inorganic filler.

11. A method according to claim 10 where the inorganic filler is selected from the group consisting of clay, calcium carbonate, mica, talc, silica, titanium oxide, and mixtures thereof.

12. A method according to claim 10, further comprising mold release compounds, flame retardant additives, and antioxidants, and impact modifiers.

13. A method according to claim 10 where the poly(alkenylaromatic) compound is polystyrene.

14. A method according to claim 10 where the inorganic filler is present in an amount of about 10% by weight.

15. An improved metallic plated thermoplastic article, which comprises: a substrate molded from a thermoplastic consisting essentially of a mixture of 50 to 80 weight percent of polyphenylene ether resin and 20 to 50 weight percent of a poly(alkenylaromatic compound), and a sufficient amount of an inorganic filler, wherein the inorganic filler is present in an amount of about 10–20 parts by weight based on 100 parts by weight of the total amount of polyphenylene ether, poly(alkenylaromatic) compound and optionally a rubber compound, to provide crevices in a substrate surface when etched; and at least one metal coating adhered directly to the substrate surface.

16. An article according to claim 15 where the inorganic filler is selected from the group consisting of clay, calcium carbonate, mica, talc, silica, titanium oxide, and mixtures thereof.

17. An article according to claim 15 where the metallic coating is an electroless metallic coating or a electrolytic coating.

* * * * *